United States Patent [19]

Gostelow

[11] Patent Number: 4,819,907
[45] Date of Patent: Apr. 11, 1989

[54] FLOW CONTROL ASSEMBLIES FOR GASEOUS FUEL

[75] Inventor: Benjamin F. Gostelow, Warrington, England

[73] Assignee: New World Domestic Appliances Limited, London, England

[21] Appl. No.: 149,916

[22] Filed: Jan. 25, 1988

Related U.S. Application Data

[63] Continuation of Ser. No. 39,767, Apr. 13, 1987, abandoned, which is a continuation of Ser. No. 782,485, Oct. 1, 1985, abandoned.

[30] Foreign Application Priority Data

Oct. 3, 1984 [GB] United Kingdom ............... 8424905

[51] Int. Cl.$^4$ ............................................. F16K 11/00
[52] U.S. Cl. ..................................... 251/96; 251/288; 137/883; 137/905
[58] Field of Search ............... 137/905, 625.46, 883; 251/95, 96, 208, 251, 286, 288

[56] References Cited

U.S. PATENT DOCUMENTS

| | | |
|---|---|---|
| 483,478 | 4/1938 | Hunt . |
| 675,528 | 7/1952 | Main . |
| 692,186 | 6/1953 | Enamel . |
| 831,809 | 3/1960 | Canon . |
| 1,015,377 | 12/1965 | Henricksen . |
| 1,137,337 | 12/1968 | Westfalia . |
| 1,465,330 | 2/1977 | Siegwart . |
| 1,775,980 | 9/1930 | Wallridge ............... 137/883 X |
| 2,083,086 | 6/1937 | Pratt et al. ............... 137/905 |
| 2,086,537 | 5/1982 | Dunphy . |
| 2,621,092 | 9/1950 | Pratt ............... 137/883 |
| 2,634,949 | 4/1953 | Robinson ............... 251/96 |
| 2,723,102 | 11/1955 | Mueller ............... 251/96 |
| 2,765,809 | 10/1956 | Lamar ............... 137/905 |
| 2,765,810 | 10/1956 | Bergquist ............... 137/905 |
| 2,961,000 | 11/1960 | Remus et al. ............... 251/96 |
| 3,011,720 | 12/1961 | Ives ............... 251/96 |
| 3,872,888 | 3/1975 | Porter ............... 137/883 |
| 4,137,945 | 2/1979 | Cutts ............... 251/96 |

Primary Examiner—A. Michael Chambers
Assistant Examiner—John C. Fox
Attorney, Agent, or Firm—Mason, Fenwick & Lawrence

[57] ABSTRACT

A gas tap for a gas cooker or hob includes a rotary disc valve (20) which controls the flow of gas from a gas rail (1) to a gas burner of the cooker or hob. To simplify the tap construction and facilitate manufacture, an external surface (2) of the gas rail (1) is used to form part of the tap housing and to provide the seating surface for the disc valve (20).

3 Claims, 6 Drawing Sheets

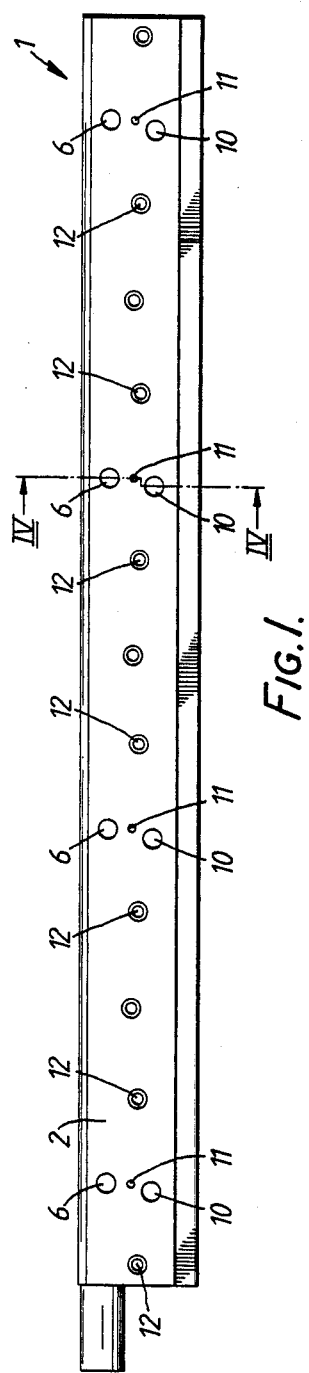
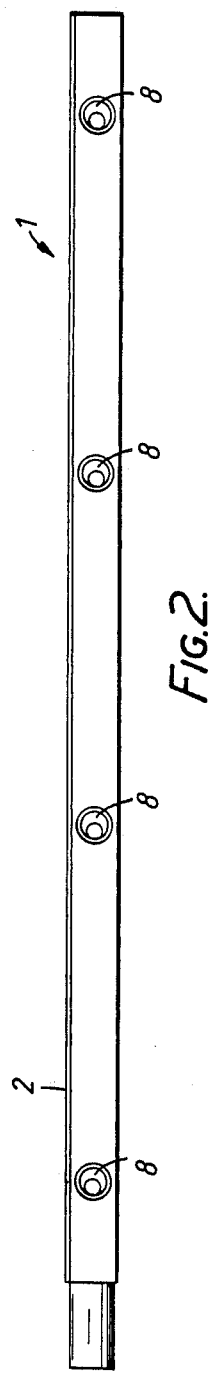
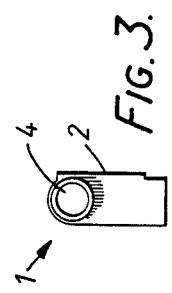
Fig. 1.
Fig. 2.
Fig. 3.

FLOW CONTROL ASSEMBLIES FOR GASEOUS FUEL

This application is a continuation of application Ser. No. 39,767, filed Apr. 13, 1987, abandoned, which is a continuation of Ser. No. 782,485 filed Oct. 1, 1985, now abandoned.

BACKGROUND OF THE INVENTION

1. Field of the Invention

This invention relates to gaseous fuel control assemblies and has particular reference to such assemblies for use with gas cookers and hobs.

2. Brief Description of the Prior Art

Conventional gaseous fuel supply assemblies for gas cookers and hobs include a gas rail upon which gas taps are mounted, the taps controlling the flow of gaseous fuel to the gas burners of the appliance. The taps are complete units with an inlet in communication with a supply bore in the rail and an outlet through which the fuel passes to the burner.

Conventionally, the valves are of the rotary plug type which are expensive to manufacture and assemble.

It is an object of the present invention to provide a gaseous fuel flow control assembly that is cheaper to manufacture and assemble than conventional assemblies.

SUMMARY OF THE INVENTION

According to the present invention, a flow control assembly for gaseous fuel comprises a gaseous fuel supply conduit having at least one surface adapted to form part of the housing of a flow control valve including a rotatable flow control member movable relatively to that surface of a part thereof to control flow of gaseous fuel from the conduit to an outlet.

The fuel supply conduit may include a bore and a first passage from the bore that terminates in a port located in the surface.

The conduit may also include a second passage formed in the conduit and terminating in a port located in the surface.

The flow control member may be coupled to a drive member mounted in the housing for rotation about the longitudinal axis of the member.

The coupling may be such as to accommodate misalignment of the drive member with respect to the flow control member.

The drive member may have a series of spaced fingers in driving engagement with the flow control member.

The flow control member may have a series of spaced recesses each of which is drivingly engaged by a different one of the fingers.

The coupling may permit axial movement of the drive member towards and away from the flow control member.

Preferably, the assembly also includes a niting arrangement defining an "OFF" position for the flow control member and in which axial movement of the drive member towards the flow control member enables the latter to be moved from the "OFF" position.

The drive member may be resiliently biassed away from the flow control member.

The resilient biassing may act also to urge the flow control member towards the surface.

The resilient bias may be provided by a helical spring seated at one end in a well in the flow control member.

The recesses may comprise slots in a wall of the well.

The flow control member may have a surface movable over the surface on the fuel supply conduit to control the flow of fuel from the conduit.

The surface on the flow control member may be in contact with the surface on the conduit.

The surface on the flow control member may include a cavity through which gaseous fuel passes from the conduit to the outlet.

The conduit may be a gas rail which may be formed from extruded aluminium or light alloy.

DESCRIPTION OF THE DRAWINGS

By way of example only, embodiments of the invention will now be described in greater detail with reference to the accompanying drawings of which:

FIGS. 1, 2 and 3 are, respectively, plan view, side view and end view of a gas rail.

DETAILED DESCRIPTION OF THE PREFERRED EMBODIMENTS OF THE INVENTION

Figure 4:
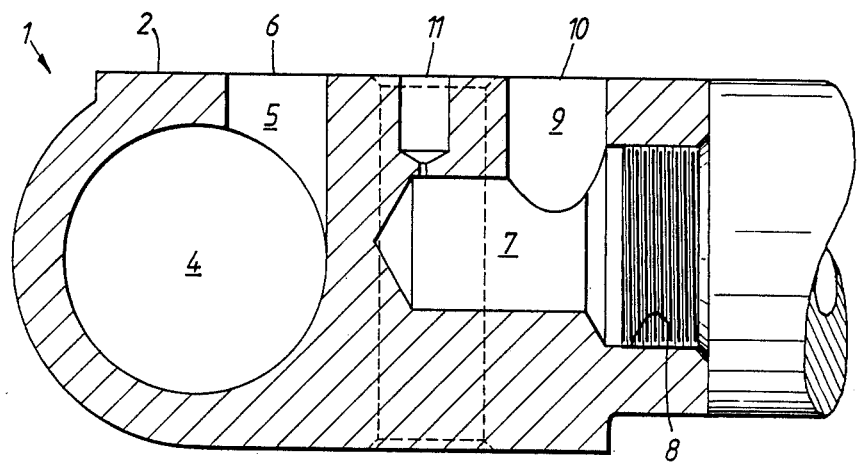
FIG. 4 is a section on a larger scale on line IV—IV of FIG. 1.

The first embodiment comprises a gas tap suitable for use with a gas cooker or hob and in which the gas tap is mounted upon a gas rail part of which forms a part of the tap.

The gas rail 1 shown in FIGS. 1, 2 and 3 is an extruded light alloy or aluminium component machined on one face to provide, along the length of the rail, a seating surface 2.

The rail 1 has a longitudinal gas supply bore 4 which lies close to one side face of the rail as can be seen from FIG. 3. The bore 4 communicates with spaced passageways 5 (FIG. 4) that terminate in spaced inlet ports 6 located within the surface 2 along the length of the rail.

The rail 1 also has a second series of spaced lateral passages 7 (FIG. 4) which terminate, at one end, in a threaded section 8 and which communicate via passages 9 with outlet ports 10 also located within the surface 2 along the length of the rail and each associated with one of the inlet ports 6.

Located between ports 6 and 11 on the surface 2 are passages 11 each of which communicates, as can be seen from FIG. 4 with one of the passages 7. The passages 11 are of a restricted transverse cross-section as can be seen from FIG. 4.

As can be seen from FIG. 1, the rail also has, along its length, a series of spaced holes 12 that extend completely through the rail at locations spaced from the bore 4 so that the holes 12 do not break into the bore.

The surface 2 forms part of each of several gas taps 13 that control, in a manner described below, gas flow from inlet port 6 to an associated outlet port 10.

Each tap 13 (FIG. 5) has a housing 14 of generally inverted cup-shaped form. The lower edge of the circular wall of the housing seats on the surface 2 and the housing is secured to the rail by legs 15 that locate in the holes 12 and are secured in place by swaging outwardly the formed lower ends of the legs.

Figure 5:
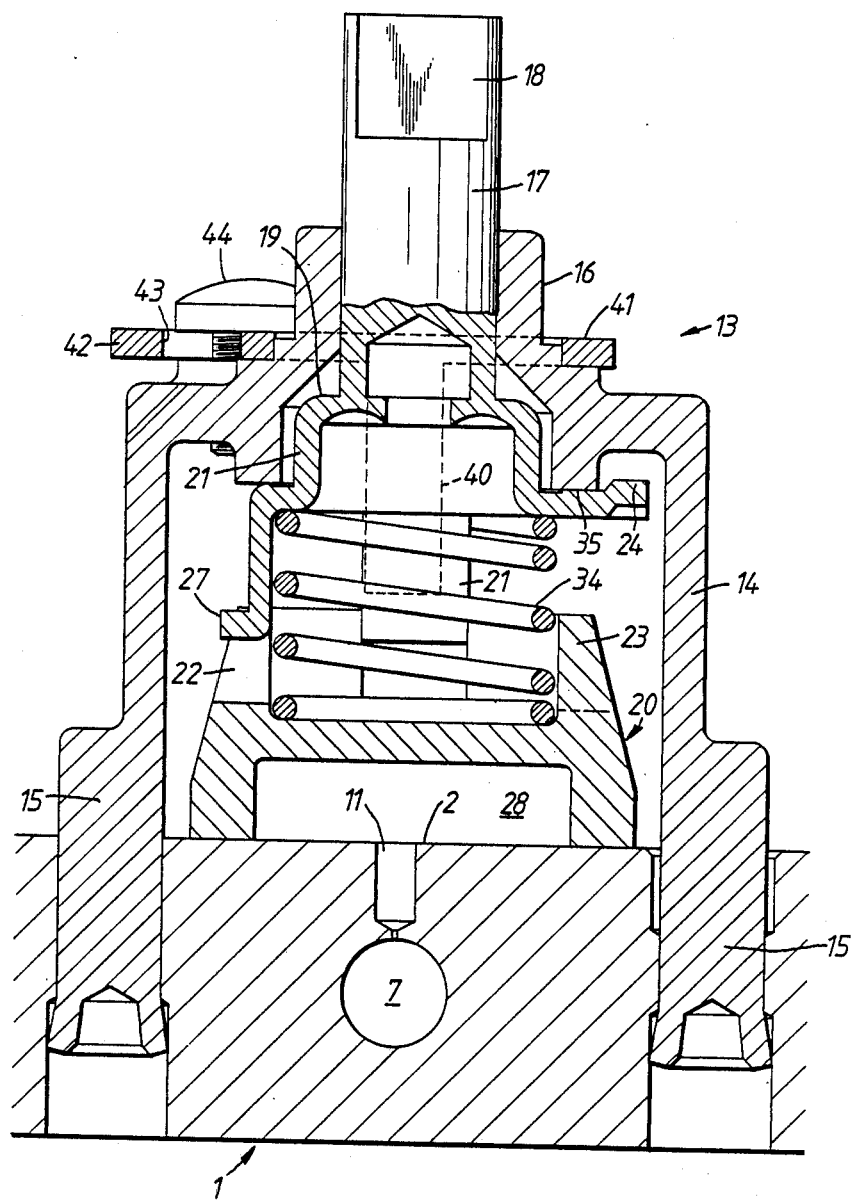
FIG. 5 is a vertical section of a gas tap embodying the invention.

The housing 14 has a tubular extension 16 in its upper surface through which an operating spindle 17 passes. That part of the spindle 16 outside the housing has a 'flat' 18 for the reception of a control knob (not shown). The lower (as seen in FIG. 5) end of the spindle is formed as a drive member 19 by means of which rotation about the longitudinal axis of the spindle 17 is transferred to a disc valve 20.

Figure 9:
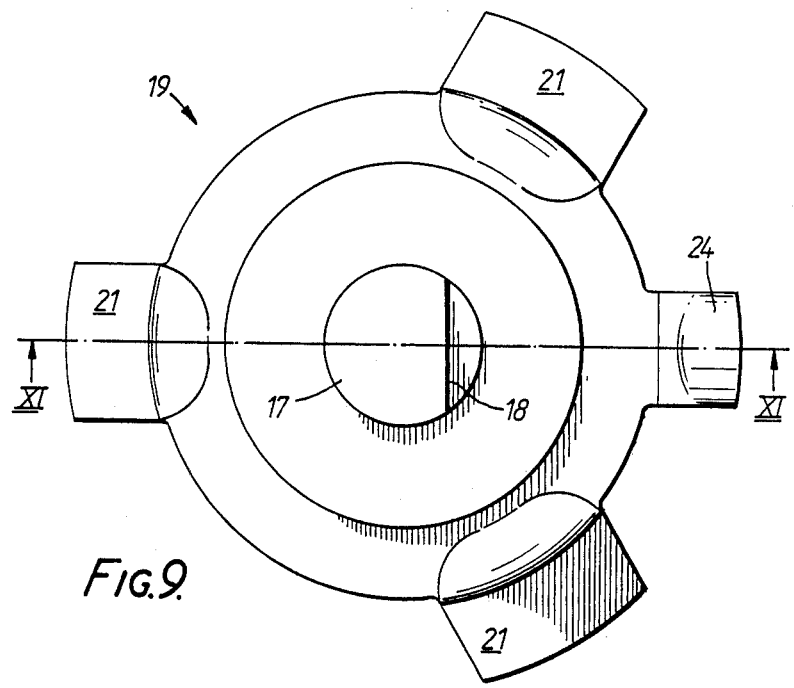

The drive member 19 (shown in more detail in FIGS. 9, 10 and 11) has three equi-spaced, downwardly extending drive fingers 21 whose lower ends are outturned to engage drive slots 22 in a peripheral wall 23 of the disc valve 20.

Figure 10:
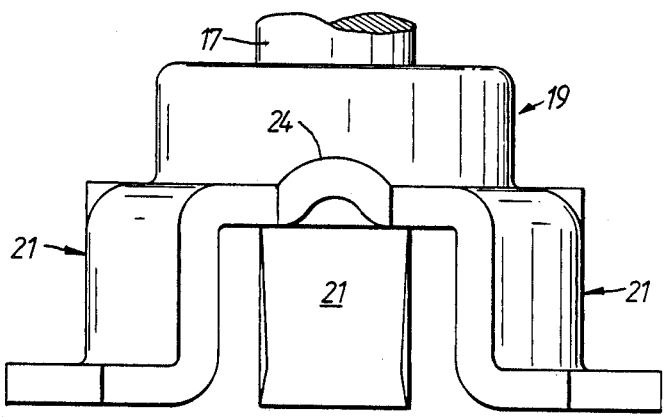
Figure 11:
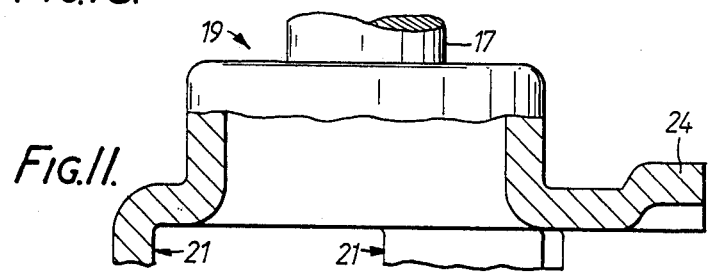

Diametrically opposite one of the fingers 21 the drive member 19 has a radial extension 24 formed with gently rounded upper and lower surfaces as can be seen in FIG. 10. The extension 24 is located at a level approximating to that of the roots of the fingers 21. The function of the extension 24 will be dealt with below. Extension 24 is smaller than the immediately adjacent fingers 21 and also smaller than the diametrically opposite finger 21. The latter is also somewhat smaller than the other equi-sized fingers. This assists in ensuring the correct orientation of the drive member 19 during assembly.

Figure 6:
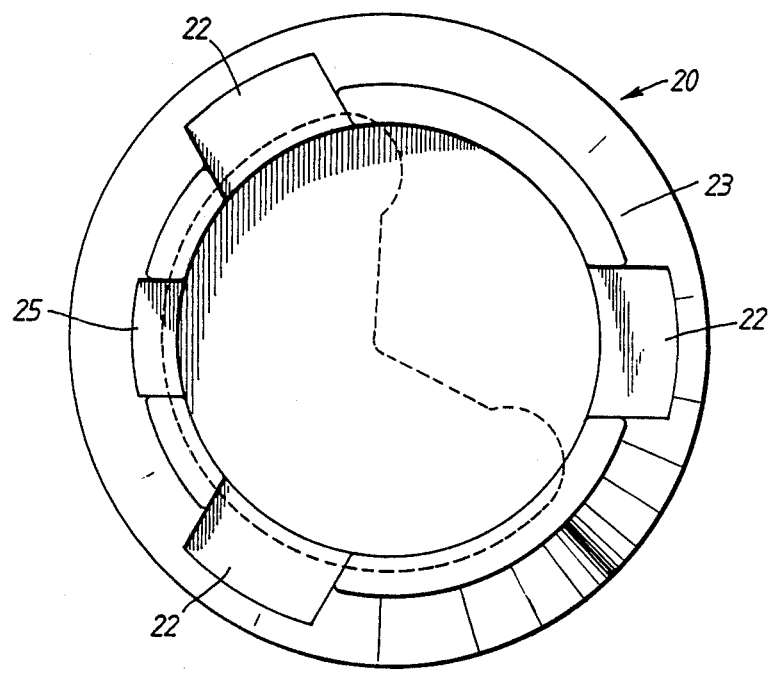
FIGS. 6 and 7 are, respectively, plan view and side view of a component of the gas tap.
Figure 7:
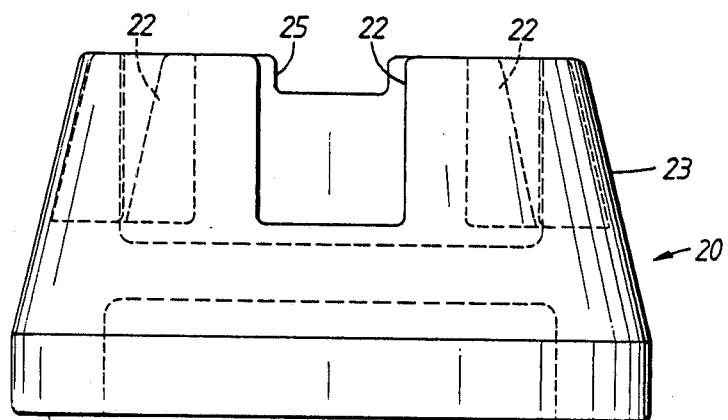

The disc valve 20 (shown in more detail in FIGS. 6, 7 and 8 has in the wall, in a position diametrically opposed to one of the slots 22, a small slot 25 whose function will be described below.

The base 26 of the disc valve 20 is machined flat to provide a surface that mates with a surface 2 to control gas flow in a manner to be described in more detail later. The base is also machined to provide a cavity 28 that extends over a large part of the surface of the base and is defined by a curved wall 29 parallel with the periphery of the base, two straight walls 30, 31 each merging into one end of wall 29 via a rounded wall 32. The walls 30, 31 meet at a point 33 that is slightly off-centre with respect to the centre of the circular base 26. The walls 30, 31 define an included angle of about 108°.

Figure 12:
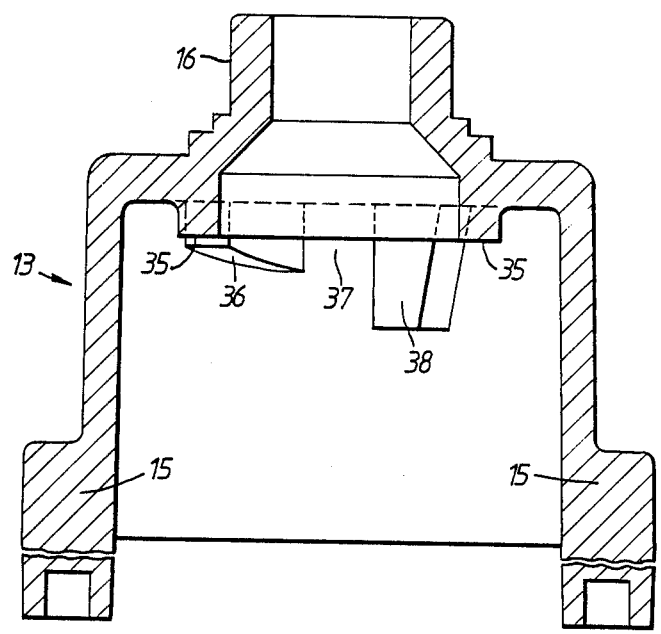
FIG. 12 is a vertical section viewed in the opposite direction to FIG. 5 of the housing of the tap.
Figure 13:
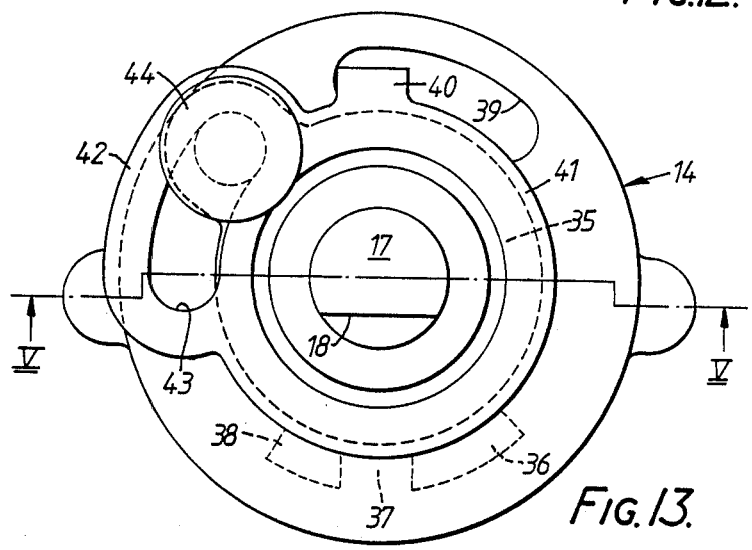
FIG. 13 is a plan view of the tap shown in FIG. 5.
Figure 14:
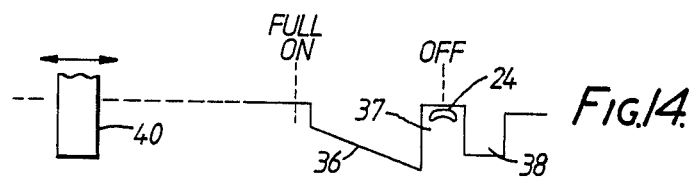
FIG. 14 is an explanatory diagram of a cam surface.

Seated in the well formed inside the wall 23 is one end of a helical spring 34 whose other end abuts the drive member 19 as shown in FIG. 5. The spring 34 urges disc valve 20 firmly on to surface 2 and the drive member upwardly so that the drive member 19 is held in contact with an annular rib 35 on the upper inner surface of the housing 14 and which forms a bearing surface for member 19. Concentric with the rib 35 and disposed outside the latter is an arcuate cam surface that, in conjunction with the extension 24, forms a niting arrangement for the tap. The cam surface which is shown in linear diagrammatic form in FIG. 14 and also shown in part in FIGS. 12 and 13, has a gap 37 between a downwardly-extending stop 38 and an inclined face 36.

Aligned with the gap 37, the housing has a slot 39 (FIG. 13) through which extends a downwardly-extending finger 40 that is part of a collar 41 that fits round the tubular extension 16 of the housing 14. The collar 41 is enlarged as indicated at 42 to accommodate an arcuate slot 43 through which passes the shaft of a screw 44 used to fix the collar to the housing. After slightly loosening the screw 44, the collar 41 can be rotated about the extension 16 with limits defined by the arcuate length of the slot 43.

In the 'OFF' position of the tap, the spindle 17 and the drive member 19 are in the positions shown in FIG. 5 and the extension 24 is located in slot 37 (FIGS. 12, 13) and out of alignment with the cam surface 36. The disc valve 20 is so located that inlet port 6 is closed by the plane lower face of the disc valve. For the sake of explanation only, the ports 6 and 10 and the passage 11 have been shown in FIG. 8 although they are not part of the disc valve 20.

Depression inwardly by a user of the spindle 17 moves the extension 24 out of slot 37 and aligns it with the cam surface 36. The fingers 21 move somewhat further into the drive slots 22 and the spring 34 is further compressed.

It is now possible to rotate the spindle 17 about its longitudinal axis. Such rotation is transferred by the fingers 21 of the drive member 19 to the valve disc 20. Rotation of spindle 17 allows inlet port 6 to communicate with the cavity at an increasing rate as the extension 24 moves along surface 36. Inlet port 6 is totally within cavity 28 when extension 24 is in the position 'FULL ON' in FIG. 13. The pressure exerted by spring 34 is sufficient to hold the extension in any position along a gas flow rate less than the 'FULL ON' rate.

Further rotation of the spindle 17 then commences to close the outlet port 10 until extension 24 comes into contact with finger 40 and further rotation of the spindle 17 is impossible. Finger 40 limits the extent to which the user can reduce the flow of gas as will be explained below.

When the user wishes to turn off the gas supply, the direction of rotation of the spindle 17 is reversed to move the extension 24 along the cam surface back towards the slot 37. When the "FULL ON" position is reached, the rotation of the spindle 17 is stopped and the user must depress the spindle slightly before rotation can be resumed.

In that way, the user is able to control the flow of gas from the gas supply bore 4 in the gas rail 1 to the lateral passages 7 from which gas flows to the gas burners of the cooker or hob.

The collar 41 with its downwardly-extending finger 40 is used to adjust the minimum flow permitted by the tap in accordance with the type of gaseous fuel on which the cooker or hob is operating, i.e. natural gas, LPG etc. By loosening the screw 44, the collar 41 can be rotated about the longitudinal axis of the spindle 17 to vary the position of the finger 40 relatively to the 'FULL ON' position.

Figure 8:
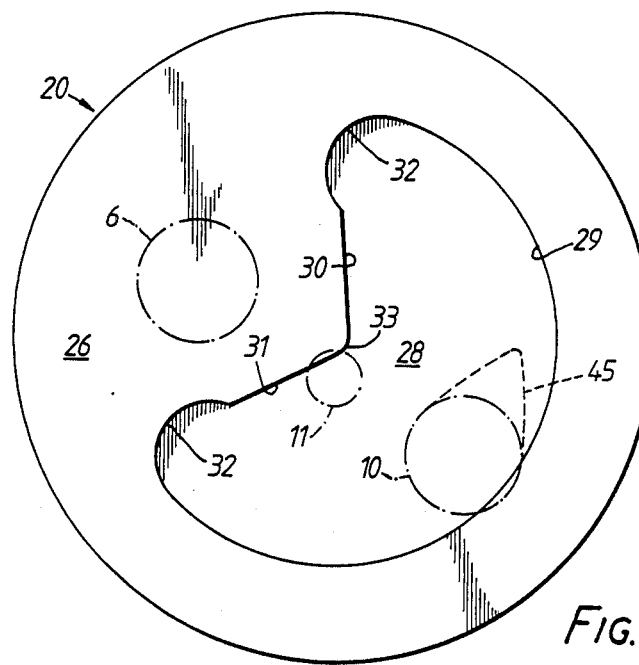
FIG. 8 is a view from underneath of the component shown in FIGS. 6 and 7, FIGS. 9, 10 and 11 are, respectively, plan view, side view and part section along the line XI—XI of FIG. 9 of another component of the gas tap.

The surface 2 of the gas rail adjacent each outlet port 10 may be machined to provide a 'V'-shaped passageway as indicated at 45 in FIG. 8 extending away from the port. The passageway 45 is of decreasing transverse area with increasing distance from the outlet port and provides a more accurate control of the gas flow at low rates of flow.

Furthermore, if desired, the contour of surface 36 may be reversed and increase in slope towards the slot 37 to provide a "snap-off" action that may be required when the tap is used to control the supply of gas to a grill burner.

It will be appreciated that the tap described above is of simple construction and is able to use parts that require little machining. The use of a drive member 19 with drive fingers 21 engaged in slot 22 in the wall 23 of the rotary disc valve 20 provides a coupling that is able to accommodate any slight misalignment of the spindle 17 relatively to the disc valve 20.

The use of a surface of the gas rail to complete the tap housing and to provide a mating surface for co-operation with the disc valve also simplifies the construction of the tap and its production cost.

It will be appreciated that the tap may be mounted upon other forms of conduit than a gas rail.

Although in the embodiment described above, the rotaty disc valve 20 is in direct contact with the surface 2 of the gas rail this is not essential. Such an arrangement depends upon the close mating engagement of the surfaces to prevent gas leakage. In an alternative embodiment the undersurface of the valve 20 has a groove formed round the cavity 28, there being a resilient leak preventing gland or member positioned in the groove. The surface of the gland is slightly proud of the undersurface of the valve 20 and provides the seal between the valve and the surface 2. The seal will be compressed somewhat by the spring 34.

I claim:

1. A gaseous fuel flow control assembly for controlling the supply of gaseous fuel to gaseous fuel burners comprising in combination:
   (1) an elongate extruded gas supply rail with a longitudinal bore,
   (2) a flat seating surface formed on the external surface of the gas supply rail along the length thereof,
   (3) a first series of passageways formed in the gas supply rail and spaced along the length of the flat seating surface,
   (4) said first series of passageways leading from the longitudinal bore to respective exit orifices in the flat seating surface and spaced along the length thereof,
   (5) a series of inlet orifices in the flat seating surface and spaced along the length thereof, each inlet orifice being associated with a respective one of the exit orifices,
   (6) a series of outlet ports in the gas supply rail and spaced along the length thereof,
   (7) a second series of passageways formed in the gas supply rail and spaced along the length thereof, each passageway of the second series extending from a respective one of the inlet orifices to a respective one of the outlet ports,
   (8) at least three of flow control valve units spaced in-line along the flat seating surface, each of the units having a housing portion mounted upon the flat seating surface in a position to allow the unit to control gaseous fuel flow from one of the exit orifices to the respective associated inlet orifice,
   (9) each said housing portion forming, with the flat seating surface on which it is mounted, a housing for the respective valve unit,
   (10) each valve unit having a rotatable flow control member located within the housing, the flow control member having a flat surface in contact with flat seating surface and overlying an exit orifice and its associated inlet orifice,
   (11) each flow control member having a flow connecting passage for connecting the said exit orifice and the inlet orifice associated with the said exit orifice,
   (12) means, in each housing, for resiliently urging the flat surface of the flow control member against the flat seating surface, and,
   (13) for each flow control valve unit, a respective valve control member that extends through the housing portion and is coupled to the flow control member for rotating the latter.

2. A flow control assembly as claimed in claim 1 and further comprising, on said valve control member,
   (1) a series of spaced coupling members and, on said rotatable flow control valve member,
   (2) a series of spaced co-operating surfaces in driven engagement with said spaced coupling members.

3. A flow control assembly as claimed in claim 2 and further comprising, on said valve control member,
   (1) an arm extending radially from the control member, and, in said housing portion,
   (2) a surface co-operating with said arm to lock the valve control member against rotation, axial movement of said valve control member against said resilient means disengaging said arm from said surface to permit rotation of the valve control member.

* * * * *